United States Patent Office 3,847,900
Patented Nov. 12, 1974

3,847,900
LABILE ESTERS OF α-ISOCYANOBENZYLPENI-
CILLIN AS CHEMICAL INTERMEDIATES
Timothy H. Cronin, Niantic, Conn., assignor to Pfizer
Inc., New York, N.Y.
No Drawing. Filed Nov. 10, 1972, Ser. No. 305,593
Int. Cl. C07d 99/16
U.S. Cl. 260—239.1                     9 Claims

ABSTRACT OF THE DISCLOSURE

α-Isocyanobenzylpenicillin esters as useful intermediates leading to the preparation of other antibacterial agents.

BACKGROUND OF THE INVENTION

This invention relates to the synthesis of penicillins, and more particularly to a class of novel α-isocyanobenzylpenicillin ester intermediates useful in the synthesis of other antibacterial penicillins.

The compounds in the group belonging to the family of penicillins differ from each other in the nature of the R variable and possess the general formula indicated below wherein the acyl moiety on the 6-aminopenicillanic acid is derived from a carboxylic acid or functional derivative thereof, such as an acyl halide or anhydride.

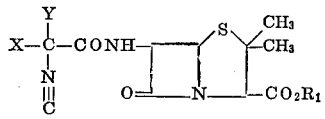

The pharmacodynamic and antibiotic properties of a given penicillin are determined to a great extent by the nature of the R group. The most widely used penicillins are those wherein the R moiety is represented by benzyl-, phenoxy- and α-phenoxyethyl.

SUMMARY OF THE INVENTION

It has now been found that a group of novel penicillins of the formula:

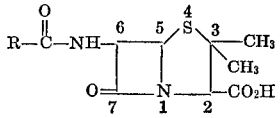

wherein $R_1$ is selected from the group consisting of alkanoyloxymethyl wherein said alkanoyl contains from 2 to 5 carbon atoms; benzyl and substituted benzyl wherein said substituent is 4-bromo, 4-nitro or 3,5-di-*t*-butyl-4-hydroxy; trimethylsilyl, bis(4-methoxyphenyl)methyl and benzylideneimino, are useful intermediates in the synthesis of other penicillins, in particular α-mandelamidobenzylpenicillin and α-acetoxyacetamidobenzylpenicillin congeners.

The preferred intermediates of the present invention include those wherein $R_1$ is alkanoyloxymethyl said alkanoyl containing from 2 to 5 carbon atoms; phenacyl; trimethylsilyl; benzylideneimino; benzyl or 4-bromobenzyl.

The aforementioned narrow range of preferred ester blocking groups, $R_1$, should not be considered limiting in nature, since protecting groups of a much larger scope are operable in the present invention. For example, phenacyl, benzyl, diphenylmethane and benzylideneiminooxy moieties as well as those having one or more organic radicals as nuclear substituent serve equally well in the present invention. Further, $R_1$ can be cycloalkyl, phenyl and mono- and disubstituted phenyl, alkyl or alkyl substituted with alkoxy, alkylthio, hydroxy, carboxy, carboxamido or halo.

Also considered within the scope of the present invention are penicillin intermediates of the formula

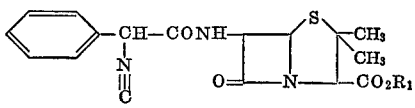

wherein $R_1$ is as previously mentioned; X is 4-benzyloxyphenyl, thienyl, 1,4-cyclohexadienyl, or alkyl containing from 1 to 3 carbon atoms; Y is hydrogen or alkyl containing from 1 to 3 carbon atoms; and X and Y taken together with the carbon atom to which they are attached form a cycloalkylidene group containing from 5 to 7 carbon atoms.

DETAILED DESCRIPTION OF THE INVENTION

The novel and valuable α-isocyanobenzylpenicillins of the present invention, useful in the preparation of other antibacterial penicillins, are synthesized from the appropriate α-aminobenzylpenicillin as illustrated:

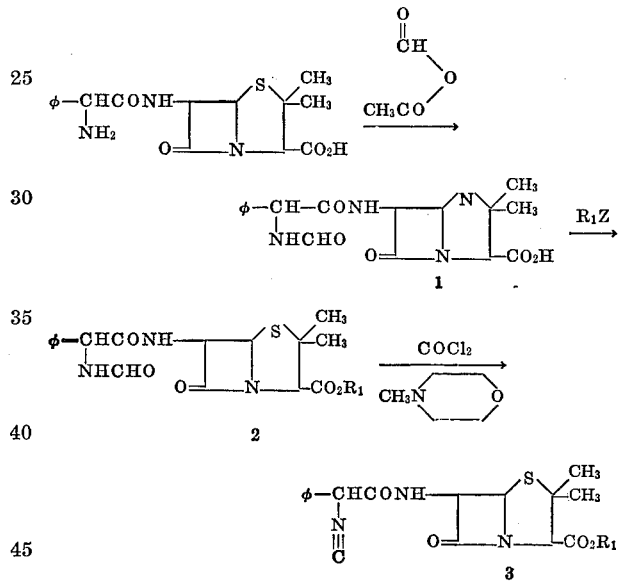

wherein $R_1$ is phenacyl, benzyl, 4-bromobenzyl, 4-nitrobenzyl, 3-5-di-*t*-butyl-4-hydroxybenzyl, bis(4-methoxyphenyl)methyl or trimethylsilyl, and Z is chloro or bromo.

In the synthesis of the α-isocyano compounds 3 wherein $R_1$ is alkanoyloxymethyl it is advantageous to start with the known α-aminobenzylpenicillin 3-alkanoyloxymethyl esters and formylate to provide compounds corresponding to 2.

Experimentally, α-aminobenzylpenicillin is formylated with the mixed anhydride of acetic acid and formic acids (W. Stevens et al., Rec. trav., 83, 1287, 1294 (1964)) in an aprotic, anhydrous, water-immiscible solvent such as chloroform or methylene chloride. Following completion of the formylation, the reaction is quenched with water and the N-formyl compound isolated from the organic phase.

Formation of the formyl-esters, 2, is effected through alkylation of the corresponding carboxylic acid salt using the appropriate halide. It is preferred that said alkylation be conducted in a polar, aprotic solvent such as dimethylformamide, dimethylsulfoxide or hexamethylphosphoramide wherein approximately equimolar amounts of the alkylating agent and acid salt are contacted. For convenience, it is preferred that said salt be generated *in situ* thus obviating the necessity for an additional step in the synthesis. Although alkali metal or tertiary amine salts can be employed with similar results, the preferred salt is that formed with triethylamine.

Following the addition of the alkylation reaction to water, the ester product 2, is extracted with a water-immiscible solvent from which unreacted acid is then removed by bicarbonate washes. Removal of the dried solvent under reduced pressure provides the desired intermediate.

Conversion of the formamide moiety to the desired isonitrile is accomplished using phosgene and N-methylmorpholine in methylene chloride at temperatures of −30 to −70° C. The preferred molar ratio of α-formamidobenzylpenicillin to morpholine to phosgene is 1:3:1.1 The phosgene, dissolved in chloroform, is added to a mixture of the penicillin and morpholine, the resulting reaction mixture being maintained at the aforementioned temperatures for a short period of time and then allowed to warm to room temperature gradually. The isonitrile product is conveniently isolated by extraction from the concentrated reaction mixture or is partitioned between water and a suitable water-immiscible solvent such as ethyl acetate.

Although the isonitriles as isolated from the aforementioned reactions can be employed in subsequent reactions leading to useful antibacterial agents, it is sometimes desired to further purify these reactive intermediates. Said purification is best carried out by chromatographing the product on a short column of silica gel. The compounds are applied with a minimum amount of ethyl acetate, or other suitable solvent and eluted with mixtures of solvents containing an increasing amount of the more polar solvent, such as benzene with an increasing amount of ethyl acetate.

Conversion of the α-isocyanobenzylpenicillin esters to the corresponding antibacterial α-acetoxyacetamidobenzylpenicillin is effected through their reaction with formaldehyde and acetic acid. Experimentally, gaseous formaldehyde, generated by heating paraformaldehyde, is bubbled into a solution of the penicillin ester and glacial acetic acid in a reaction-inert solvent such as diethyl ether. The reaction is carried out at ambient temperatures and is complete in a few minutes. Any excess acid and formaldehyde are washed from the reaction solvent with dilute aqueous base. The organic phase is subsequently worked up in a conventional manner to provide the intermediate ester.

The use of the trimethylsilyl ester obviates the necessity for the use of base, since the addition of water results in rapid hydrolysis of the trimethylsilyl group and formation of the free acid.

Intermediates wherein the blocking group is benzyl or substituted benzyl are subjected to a debenzylation procedure and comprises shaking a solution of the appropriate benzyl ester dissolved in methanol or ethanol with palladium-on-charcoal, preferably 5–10%, in a hydrogen atmosphere at an initial pressure of 30–50 p.s.i. Following the debenzylation, which also is a rapid reaction, the spent catalyst is filtered and the filtrate worked up so as to remove any unreacted ester from the desired product.

Removal of the protecting phenacyl and benzylideneimino esters is effected using an equimolar amount of sodium thiophenoxide in a polar, aprotic solvent such as dimethylformamide. Work-up comprises addition of the reaction mixture to water followed by extraction of the desired product with an appropriate water-immiscible solvent such as ethyl acetate.

The ease with which alkanoyloxymethyl esters are hydrolyzed in vivo obviates the necessity for their removal prior to the administration to a host.

In a similar aforementioned manner other alkanoic and benzoic acids can be substituted for acetic acid, giving rise to a wide variety of antibacterial compounds comprising α-alkanoyloxyacetamido- and α-benzoyloxyacetamidobenzylpenicillins. Alternately, aliphatic aldehydes other than formaldehyde can be employed and result in the formation of α-1-alkanoyloxyalkanoylaminobenzylpenicillins or the benzoyloxy congeners.

Reaction of α-isocyanobenzylpenicillin esters with benzaldehyde and acetic acid gives rise to α-mandelamidobenzylpenicillin esters. Said reaction is effected between equimolar amounts of isonitrile and benzaldehyde and acetic acid, with as much as a 50–100% excess of the latter two reagents. The reaction is preferably conducted at ambient temperatures and requires from 12 to 72 hours depending on concentration and inherent reactivity of the starting materials. The preferred solvent is diethyl ether.

Removal of the protecting group from the carboxyl function is effected using the same techniques previously mentioned in the α-acetoxyacetamidobenzylpenicillin series.

As previously mentioned, the alkanoyloxymethyl esters of the antibacterial agents formed from these useful intermediates although inactive or of relatively low activity against microorganisms in vitro, when administered orally to animals, including man, are metabolized to the parent acid, and demonstrate a wide spectrum of activity against bacteria. They thus serve as pro-drug forms of the parent compound since they are biologically converted in vivo to said compounds. The rate of metabolic conversion of such esters to the parent acid occurs at such a rate as to provide an effective and prolonged concentration of the parent acid in the animal body; thus these esters act as a depot source for the parent acid.

Regarding the requisite starting materials leading to the α-isocyanobenzylpenicillin esters, α-aminobenzylpenicillin is a known and commercial material, while the 3-alkanoyloxymethyl esters thereof are described in U.S. 3,660,575. The necessary chemical reagents for introducing the protecting groups at the 3-carboxy group are all commercially available.

As has been previously noted, a characteristic feature of the acidic compounds formed from the α-isocyanobenzylpenicillin esters of the instant invention is their ability to form basic salts. Acid congeners thereof are converted to basic salts by the interaction of said acid with an appropriate base in an aqueous or nonaqueous medium. Such basic reagents suitably employed in the preparation of said salts can vary in nature, and are meant to contemplate such bases as organic amines, ammonia, alkali metal hydroxides, carbonates, bicarbonates, hydrides and alkoxides, as well as alkali earth metal hydroxides, hydrides, alkoxides and carbonates. Representative of such bases are ammonia, primary amines such as n-propylamine, n-butylamine, aniline, cyclohexylamine, benzylamine, p-toluidine, ethylamine, octylamine, secondary amines such as dicyclohexylamine and tertiary amines such as diethylaniline, N-methylpyrrolidine, N-methylmorpholine and 1,5-diazabicyclo-[4,3,0]-5-nonene; sodium hydroxide, potassium hydroxide, ammonium hydroxide, sodium ethoxide, potassium methoxide, magnesium hydroxide, calcium hydride and barium hydroxide.

In the utilization of the chemotherapeutic activity of those compounds synthesized from the isonitriles of the present invention which form basic salts, it is preferred, of course, to use pharmaceutically acceptable salts. Although water insolubility, high toxicity, or lack of crystalline nature may make some salt species unsuitable or less desirable for use as such in a given pharmaceutical application, the water insoluble or toxic salts can be converted to the corresponding acids by decomposition of the salts as described above, or alternately they can be converted to any desired pharmaceutically acceptable basic salt. The said pharmaceutically acceptable salts preferred include the sodium, aluminum, potassium, calcium, magnesium, ammonium and substituted ammonium salts, e.g., procaine, dibenzylamine, N,N-bis(dehydroabietyl)ethylenediamine, 1-ephenamine, N-ethylpiperidine, N - benzyl-β-phenethylamine, N,N′-dibenzylethylenediamine, triethylamine, as well as salts with other amines which have been used to form salts with benzylpenicillin.

The antibacterial penicillins described herein exhibit in vitro activity against a wide variety of micro-organisms, including both gram-positive and gram-negative bacteria. Their useful activity can readily be demonstrated by in vitro tests against various organisms in a brain-heart infusion medium by the usual two-fold serial dilution technique. The in vitro activity of the herein described compounds renders them useful for topical application in the form of ointments, creams and the like, or for sterilization purposes, e.g., sick-room utensils.

These novel penicillins are also effective antibacterial agents in vivo in animals, including man, not only via the parenteral route of administration but also by the oral route of administration.

Obviously, the physician will ultimately determine the dosage which will be most suitable for a particular individual person, and it will vary with the age, weight and response of the particular patient as well as with the nature and extent of the symptoms, the nature of the bacterial infection being treated and the pharmacodynamic characteristics of the particular agent to be administered. It will often be found that when the composition is administered orally, larger quantities of the active ingredient will be required to produce the same level as produced by a small quantity administered parenterally.

Having full regard for the foregoing factors it is considered that an effective daily oral dose of the compounds formed from the isonitriles of the present invention in humans of approximately 50–500 mg./kg. per day, with a preferred range of about 75–350 mg./kg. per day in single or divided doses, and a parenteral dose of 25–300 mg./kg. per day, with a preferred range of about 20–200 mg./kg. per day will effectively alleviate the symptoms of the infection. These values are illustrative, and there may, of course, be individual cases where higher or lower dose ranges are merited.

The preferred useful intermediates of the present invention are α-isocyanobenzylpenicillin 3-pivaloyloxymethyl ester, α-isocyanobenzylpenicillin 3-phenacyl ester, α - isocyanobenzylpenicillin 3-trimethylsilyl ester, α - isocyanobenzylpenicillin-3-benzyl ester, α-isocyanobenzylpenicillin 3-p-bromobenzyl ester and α-isocyanobenzylpenicillin 3-benzylideneimino ester.

The antimicrobial spectra of some products formed from the useful intermediates of the present invention are porvided in the following tables. Table I demonstrates the in vitro profile of α - mandelamidobenzylpenicillin 3 - pivaloyloxymethyl ester. The tests were run under standardized conditions in which nutrient broth containing various concentrations of the test material was seeded with the particular organism specified, and the minimum concentration (MIC) at which growth of each organism failed to occur was observed and recorded.

TABLE I

In vitro Activity for α-Mandelamidobenzylpenicillin 3-pivaloyloxymethyl ester

| Organism: | MIC; mcg./ml. |
|---|---|
| E. coli 51A266 | 50 |
| Ps. aeruginosa 52A490 | 50 |
| Ps. aeruginosa 52A104 | >200 |
| P. mirabilis 57C015 | 25 |
| Strep. pyogenes 02C203 | 0.01 |
| Ser. marcescens 63A001 | >200 |
| H. influenzae | 1.56 |
| Sal. cholerae-suis 58B242 | 50 |
| S. aureus 01A006 | 0.391 |
| S. aureus 01A005 | 0.098 |

Table II presents the in vivo comparison data for the same compound contained in Table I against several experimental infections in mice.

The values (percent of survivors) are obtained under standard conditions known to those skilled in the art. For the E. coli organism, the test compound is administered to the infected mice by a multiple dosing regimen in which the first dose is given 0.5 hour after inoculation and is repeated four and twenty-four hours later.

TABLE II

| Organism | Route [1] | Dose (mg./kg.) | Percent protection [2] |
|---|---|---|---|
| E. coli 51A266 | PO | 200 | 30 |
| | | 50 | 20 |
| | | 25 | 30 |
| Do | SC | 200 | 70 |
| | | 50 | 40 |
| | | 25 | 20 |

[1] PO=oral; SC=subcutaneous route of administration.
[2] Percent of survivors.

Table III presents additional in vitro data for related compounds prepared from the isonitriles of the instant invention.

TABLE III

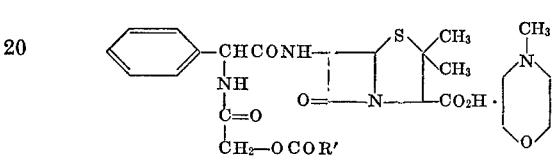

| Organism | MIC (mcg./ml.) | |
|---|---|---|
| | $R'=CH_3$ | $R'=\phi$ |
| S. aureus 01A005 | 1.56 | 0.39 |
| Ps. aeruginosa 52A104 | 200 | 200 |
| Ps. aeruginosa 52A490 | 12.5 | 12.5 |
| Kleb. pneumoniae 53A009 | 200 | 200 |
| P. vulgaris 57A059 | 25 | 100 |
| P. mirabilis 57C015 | 25 | 50 |
| Entero. aer. 55A002 | 100 | 100 |
| E. coli 51A266 | 50 | 50 |

Table IV presents in vivo comparison data for α-acetoxyacetamidobenzylpenicillin 3 - pivaloyloxymethyl ester against E. coli infections in mice.

The values, reported as percent survivors, are obtained under standard conditions familiar to those skilled in the art. The test compound is administered to the infected mice by a multiple dosing regimen in which the first dose is given 0.5 hour after inoculation and is repeated four and twenty-four hours later.

TABLE IV

In vivo activity for α-acetoxyacetamidobenzylpenicillin 3-pivaloyloxymetyl ester

| Organism | Route | Dose (mg./kg.) | Percent protection |
|---|---|---|---|
| E. coli 51A266 | PO | 200 | 10 |
| | | 50 | 10 |
| | | 25 | 0 |
| Do | SC | 200 | 40 |
| | | 50 | 30 |
| | | 25 | 10 |

The products resulting from the reactions of the α-isocyanobenzylpenicillin esters of this invention are of value as antibacterial agents and are remarkably effective in treating a number of infections caused by susceptible gram-negative and gram-positive bacteria in poultry and animals including man. For such purposes, the pure materials or mixtures thereof with other antibiotics can be employed. They may be administered alone or in combination with a pharmaceutical carrier on the basis of the chosen route of administration and standard pharmaceutical practice. For example, they may be administered orally in the form of tablets containing such excipients as starch, milk sugar, certain types of clay, etc., or in capsules alone or in admixture with the same or equivalent excipients. They may also be administered orally in the form of elixirs or oral suspensions which may contain flavoring or coloring agents, or be injected parenterally, that is, intramuscularly or subcutaneously. For parenteral administration, they are best used in the form of a sterile aqueous solution which may be either aqueous such as water, isotonic saline, isotonic dextrose, Ringer's solution, or non-aqueous such as fatty oils of vegetable origin (cotton seed, peanut oil, sesame) and other non-aqueous vehicles which will not interfere with the therapeutic efficiency of the preparation and are nontoxic in the volume or proportion used (glycerol, propylene, sorbitol). Additionally, compositions suitable for extemporaneous preparation of solutions prior to administration may advantageously be made. Such compositions may include liquid diluents, for example, propylene glycol, diethyl carbonate, glycerol, sorbitol, etc.; buffering agents, as well as local anesthetics and inorganic salts to afford desirable pharmacological properties.

The following examples are provided solely for the purpose of illustration and are not to be construed as limitations of this invention, many variations of which are possible without departing from the spirit or scope thereof.

EXAMPLE 1

α-Isocyanobenzylpenicillin 3-pivaloyloxymethyl ester

A. α - Formamidobenzylpenicillin 3-pivaloyloxymethyl ester: To a mixture of 25 g. (0.05 mole) of α-aminobenzylpenicillin 3-pivaloyloxymethyl ester hydrochloride in 250 ml. of methylene chloride and 44 ml. (0.3 mole) of triethylamine is added with stirring 7.4 g. (0.05 mole) of acetic-formic anhydride·acetic acid (W. Stevens et al., Rec. trav., 83, 1287 (1964), and the resulting orange solution allowed to stir at room temperature for 2 hrs. An additional one gram of the formylating mixture is added and stirring continued for one hour. The reaction is quenched with 100 ml. of water and the pH adjusted to 3 with 6N hydrochloric acid. The aqueous layer is further extracted with methylene chloride and the combined organic phases washed with a saturated brine solution and dried over sodium sulfate. Concentration of the methylene chloride solution to dryness in vacuo provides the desired intermediate as a yellow solid residue, 22.5 g.

B. α - Isocyanobenzylpenicillin 3-pivaloyloxymethyl ester: A solution of 22 g. (0.045 mole) of α-formamidobenzylpenicillin 3-pivaloyloxymethyl ester and 9.1 g. (0.9 mole) of N-methylmorpholine in 500 ml. of methylene chloride cooled to —30 to —40° C. is treated dropwise with 22.6 ml. of a 2N solution of phosgene in methylene chloride (0.045 mole). The resulting reaction mixture is allowed to stir in the cold for one hour and then allowed to warm to —5° C. at which time 200 ml. of water is added. The aqueous layer is extracted again with methylene chloride and the combined organic phases are washed successively with a saturated sodium bicarbonate solution and finally a brine solution. After drying the organic phase over sodium sulfate, the solution is concentrated under reduced pressure to provide the crude product, 20 g. The crude material is charged on a pad of silica gel in a small amount of ethyl acetate and is eluted using benzene-ethyl acetate in a ratio of 5:1. The eluates are combined and concentrated to dryness in vacuo providing the purified product, 12.5 g.

EXAMPLE 2

Starting with the appropriate α-aminobenzylpenicillin 3-alkanoyloxymethyl ester and repeating the procedures of Example 1A–1B, the following esters are synthesized: α-isocyanobenzylpenicillin 3-acetoxymethyl ester; α-isocyanobenzylpenicillin 3-butyryloxymethyl ester; α-isocyanobenzylpenicillin 3-isobutyryloxymethyl ester and α-isocyanobenzylpenicillin 3-valeryloxymethyl ester.

EXAMPLE 3

α-Isocyanobenzylpenicillin 3-benzyl ester

A. α-Formamidobenzylpenicillin: A suspension of 3.49 g. (0.01 mole) of α-aminobenzylpenicillin in 50 ml. of methylene chloride containing 5.05 g. (0.05 mole) of triethylamine is treated dropwise with 2.5 g. of acetic-formic anhydride·acetic acid and the resulting reaction mixture allowed to stir at room temperature for 1.5 hrs. The solvent is removed in vacuo and the residue partitioned between ethyl acetate and an aqueous brine solution. The aqueous layer is extracted once more with ethyl acetate and then acidified with hydrochloric acid to pH 2.8. The aqueous acid is again extracted, and the ethyl acetate extracts are combined and dried over sodium sulfate. Removal of the solvent provides the desired intermediate in 85% yield.

B. α-Formamidobenzylpenicillin 3-benzyl ester: Benzyl bromide (1.71 g., 0.01 mole) is added dropwise to a solution of 3.77 g. (0.01 mole) of α-formamidobenzylpenicillin and 1.4 ml. of triethylamine in 50 ml. of dimethylformamide, and the reaction mixture allowed to stir at room temperature overnight. Ethyl acetate (100 ml.) is added to the reaction, and the resulting solution extracted twice with a sodium bicarbonate solution. The organic phase is subsequently washed with a saturated brine solution and dried over sodium sulfate. Removal of the solvent under reduced pressure yields 3.38 g. of the intermediate.

C. α-Isocyanobenzylpenicillin 3-benzyl ester: A solution of phosgene in chloroform (5.7 ml. of 1.4 molar) is added slowly to 3.38 g. (7.2 mmoles) of α-formamidobenzylpenicillin 3-benzyl ester and 2.42 ml. of N-methylmorpholine in 45 ml. of methylene chloride cooled to —60° C. After the addition is complete, the reaction is stirred for 15 min. and then allowed to warm to —40° C. for 30 min. After the mixture is allowed to warm slowly to room temperature, most of the solvent is removed in vacuo and ethyl acetate (50 ml.) is added. The organic solution is washed (3×) with an aqueous bicarbonate solution and finally with a brine solution. The ethyl acetate is subsequently dried over sodium sulfate, treated with charcoal and concentrated to a foam, 3.15 g.

The desired product can be further purified by chromatographing on a short column of silica gel.

EXAMPLE 4

α-Isocyanobenzylpenicillin 3-p-bromobenzyl ester

A. α - Formamidobenzylpenicillin 3 - p - bromobenzyl ester: In a manner similar to Example 3B, 250 mg. (1 mmole) of p-bromobenzyl bromide, 377 mg. (1 mmole) of α-formamidobenzylpenicillin and .28 ml. of triethylamine in 1 ml. of dimethylformamide provide on workup 272 mg. of the desired intermediate.

B. α-Isocyanobenzylpenicillin 3-p-bromobenzyl ester: To 7.9 g. (0.0145 mole) of α-formamidobenzylpenicillin 3-p-bromobenzyl ester and 4.4 g. (0.0435 mole) of N-methylmorpholine in 80 ml. of methylene chloride cooled to —40° C. is added dropwise 10.3 ml. of a 1.41 M solution of phosgene in chloroform. After stirring in the cold for one hour, the mixture is allowed to warm to room temperature and most of the solvent subsequently removed under reduced pressure. Ethyl acetate is added (50 ml.) and the organic layer washed with an aqueous sodium bicarbonate solution, then a brine solution. The ethyl acetate layer is dried over sodium sulfate and concentrated in vacuo to dryness, 7.46 g.

EXAMPLE 5

Starting with α-formamidobenzylpenicillin and the appropriate halide, and repeating the procedure of Example 3, the following α-isocyanobenzylpenicillin esters are synthesized: α - isocyanobenzylpenicillin 3 - p - nitrobenzyl ester; α-isocyanobenzylpenicillin 3-(3',5'-di-t-butyl-4'-hydroxybenzyl)ester; α-isocyanobenzylpenicillin 3-bis(4'-methoxyphenyl) methyl ester and α-isocyanobenzylpenicillin 3-phenacyl ester.

EXAMPLE 6

α-Isocyanobenzylpenicillin 3-benzylideneimino ester

A. α - Formamidobenzylpenicillin 3 - benzylideneimino ester: To a suspension of 3.77 g. (0.01 mole) of α- formamidobenzylpenicillin potassium salt cooled to −5° C. is added dropwise 0.96 ml. of ethyl chloroformate and one drop of pyridine. After stirring the mixture for 30 minutes in the cold, 1.2 g. (0.01 mole) of benzaldehyde oxime in 7 ml. of acetone is added and the resulting reaction mixture is then allowed to stir at room temperature for 2 hours. The mixture is filtered and the filtrate evaporated to dryness in vacuo. The crude product is dissolved in ethyl acetate and is subsequently washed successively with 10 ml. portions of water, sodium bicarbonate and water. The organic layer is separated, dried over magnesium sulfate, concentrated to a small volume and diluted with ether. The precipitated product is filtered and dried.

B. α - Isocyanobenzylpenicillin 3 - benzylideneimino ester: A mixture of 10.2 g. (0.0214 mole) of α-formamidobenzylpenicillin 3-benzylideneimino ester and 7.2 ml. of N-methylmorpholine is stirred in 100 ml. of methylene chloride at −70° C. while 23.0 ml. of a 1.15 M solution of phosgene in chloroform is added dropwise. The resulting reaction mixture is stirred at −70° C. for 30 min., at −40° C. for 30 min., and finally allowed to warm to room temperature. Most of the solvent is removed in vacuo followed by the addition of 75 ml. of ethyl acetate. The organic solution is subsequently washed successively with (3×) a saturated sodium bicarbonate solution and finally a brine solution. The ethyl acetate is then dried over sodium sulfate and concentrated to a foam.

Further purification can be effected by chromatographing on a short column of silica gel employing a mixture of benzene-ethyl acetate (5:1) as the eluate.

EXAMPLE 7

α-Isocyanobenzylpenicillin trimethylsilyl ester

A. α-Formamidobenzylpenicillin trimethylsilyl ester: Trimethylchlorosilane (1.08 g., 0.01 mole) is added dropwise to a suspension of 4.15 g. (0.01 mole) of α-formamidobenzylpenicillin potassium salt in 50 ml. of dry dimethylformamide, and the reaction mixture allowed to stir at room temperature overnight. The mixture is concentrated in vacuo and ethyl acetate added to the residual materials. The solids are filtered and the ethyl acetate removed under reduced pressure. The residual intermediate is employed in the next step without further purification.

B. α-Isocyanobenzylpenicillin trimethylsilyl ester: A suspension of 4.49 g. (0.01 mole) of α-formamidobenzylpenicillin trimethylsilyl ester and 3.03 g. (0.03 mole) of N-methylmorpholine in 50 ml. of dry methylene chloride is cooled to −60° C. and then treated dropwise with 8.55 ml. of a 1.4 M solution of phosgene in chloroform. The mixture is maintained at −60° C. for 45 min., at −30° C. for 30 min. and then allowed to warm to room temperature. The reaction is concentrated to near dryness and repeatedly extracted with diethyl ether. The ether extracts are combined and the solvent removed in vacuo. The desired product is employed in subsequent reactions without further purification.

EXAMPLE 8

α-Mandelamidobenzylpenicillin 3-pivaloyloxymethyl ester

To a solution of 1.105 g. of benzaldehyde and 619 mg. of glacial acetic acid is added a solution of 2.5 g. of α-isocyanobenzylpenicillin 3-pivaloyloxymethyl ester in 30 ml. of diethyl ether and the reaction mixture allowed to stir at room temperature for 72 hrs. The reaction mixture is washed successively with (2×) a saturated sodium bicarbonate solution and water, and finally dried over sodium sulfate. The solvent is removed under reduced pressure and the residual material, 2.7 g., charged on a short silica gel column using a small volume of ethyl acetate. The first three 75 ml. eluate fractions are comprised of benzene; fractions 4–7, also 75 ml. each, are benzene-ethyl acetate (9:1) and the final fractions 8–11 are benzene-ethyl acetate (1:1). The final three fractions are combined and concentrated to dryness to provide the desired product, 1.0 g.

EXAMPLE 9

α-Acetoxyacetamidobenzylpenicillin 3-pivaloyloxymethyl ester

Formaldehyde, generated by heating paraformaldehyde, is bubbled into a solution of 2.0 g. of α-isocyanobenzylpenicillin 3-pivaloyloxymethyl ester and 600 mg. of glacial acetic acid in 20 ml. of diethyl ether until the theoretical amount plus a small excess has been added. Water (20 ml.) and 30 ml. of diethyl ether are added and the pH adjusted to 7.5 with a 5% sodium hydroxide solution. The organic phase is separated, concentrated to dryness and the residue dissolved in methylene chloride. The methylene chloride solution is subsequently washed (2×) with water, dried over sodium sulfate and concentrated in vacuo to a yellow solid, 2.1 g. The crude product is charged on a short silica gel column employing a minimum amount of ethyl acetate. The first three eluates of 75 ml. each are comprised only of benzene, while the remaining fractions are composed of 20% ethyl acetate-benzene. Fractions 5 and 6 are combined and concentrated to dryness to provide the desired product, 940 mg.

EXAMPLE 10

Starting with the requisite α-isocyanobenzylpenicillin 3-alkanoyloxymethyl from Example 2 and employing the indicated procedure, the following compounds are synthesized:

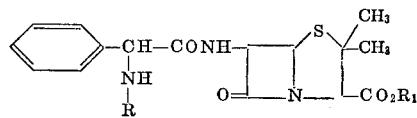

| R | R₁ | Procedure |
|---|----|-----------|
| φCHOCHCO— | CH₃CO₂CH₂— | Example 8. |
| φCHOCHCO— | CH₃(CH₂)₂CO₂CH₂— | Do. |
| φCHOCHCO— | CH₃(CH₂)₃CO₂CH₂— | Do |
| CH₃CO₂CH₂CO— | CH₃CO₂CH₂— | Example 9. |
| CH₃CO₂CH₂CO— | (CH₃)₂CHCO₂CH₂— | Do. |
| CH₃CO₂CH₂CO— | CH₃(CH₂)₂CO₂CH₂— | Do. |
| CH₃CO₂CH₂CO— | CH₃(CH₂)₃CO₂CH₂— | Do. |

EXAMPLE 11

α-Acetoxyacetamidobenzylpenicillin

A. α-Acetoxyacetamidobenzylpenicillin 3-benzyl ester: In a manner similar to that in Example 9, formaldehyde is bubbled into a solution of 2.24 g. of α-isocyanobenzylpenicillin 3-benzyl ester and .33 ml. of glacial acetic acid in 25 ml. of methylene chloride until 450 mg. has been added. After stirring for 2 hrs., the mixture is washed with water (2×) and, finally, with a brine solution. The organic phase is dried over sodium sulfate and subsequently concentrated to give the product, 2.5 g.

B. α-Acetoxyacetamidobenzylpenicillin: A solution resulting from 5 ml. of a saturated sodium bicarbonate solution, 15 ml. of methanol, 539 mg. of α-acetoxyacetamidobenzylpenicillin 3-benzyl ester and 10 ml. of ethyl acetate is treated with 300 mg. of 10% palladium-on-charcoal and the mixture shaken in a hydrogen atmosphere at an initial pressure of 45 p.s.i. After 20 min. the theoretical amount of hydrogen is absorbed and the spent catalyst is filtered. The filtrate is concentrated to dryness and the residual is partitioned between ethyl acetate and an aqueous sodium bicarbonate solution.

The organic phase is discarded and the aqueous adjusted to pH 3.0 with hydrochloric acid and extracted with fresh ethyl acetate. One equivalent of N-methylmorpholine is added and the solution concentrated under reduced pressure to dryness to provide the N-methylmorpholine salt, 335 mg.

The free acid is obtained by treating the salt with aqueous acid at pH 3.5 followed by extraction of the free acid with ethyl acetate and subsequent removal of the organic solvent *in vacuo*.

EXAMPLE 12

In a manner similar to that in Example 11, α-acetoxyacetamidobenzylpenicillin is synthesized by starting with formaldehyde, glacial acetic acid and the following α-isocyano analogs:

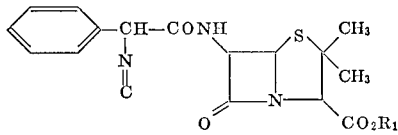

$R_1$:
- $p$—$NO_2C_6H_4CH_2$—
- ($p$—$CH_3OC_6H_4$)$_2CH$—
- $p$—$BrC_6H_4CH_2$—
- $3,5$—($t$—$C_4H_9$)$_2$—$4$—$OHC_6H_2CH_2$—

EXAMPLE 13

α-Benzoyloxyacetamidobenzylpenicillin

A. α - Benzoyloxyacetamidobenzylpenicillin 3 - benzylideneimino ester: Into a solution of 4.62 g. of α-isocyanobenzylpenicillin 3-benzylideneimino ester and 1.4 g. of benzoic acid in 50 ml. of methylene chloride is bubbled 900 mg. of formaldehyde, generated from heating paraformaldehyde. The reaction mixture is allowed to stir at room temperature for 30 min. and is then treated with a saturated sodium bicarbonate solution. The organic phase is separated, washed with a saturated brine solution, and dried over sodium sulfate. Removal of the solvent provides the desired intermediate.

B. α-Benzoyloxyacetamidobenzylpenicillin: A solution of 1.22 g. (0.002 mole) of α-benzoyloxyacetamidobenzylpenicillin 3-benzylideneimino ester and 224 mg. (0.002 mole) of sodium thiophenoxide in 5 ml. of dimethylformamide is allowed to stir at room temperature for 30 minutes. The reaction mixture is diluted with ether and the mixture allowed to stir at ice-bath temperatures for an additional 10 minutes. The sodium salt of the product after being filtered and washed several times with ether, is dissolved in water layered with ethyl acetate and treated with sufficient hydrochloric acid to provide a pH of 3.5. The ethyl acetate is subsequently removed, dried over sodium sulfate and concentrated *in vacuo* to provide the desired product.

EXAMPLE 14

α-Mandelamidobenzylpenicillin

A solution of 2.7 g. (6.35 moles) of α-isocyanobenzylpenicillin 3-trimethylsilyl ester in 30 ml. of ethyl ether is added to 1.1 g. of benzaldehyde and 619 mg. of glacial acetic acid and the resulting reaction mixture allowed to stir at room temperature for 36 hrs. The mixture is extracted several times with a solution of sodium bicarbonate and the bicarbonate extracts subsequently combined, layered over with fresh ethyl acetate and rendered acid to pH 3.5 with hydrochloric acid. The organic phase is separated, dried over sodium sulfate and concentrated under reduced pressure to provide the desired product.

EXAMPLE 15

Tablets

A tablet base is prepared by blending the following ingredients in the proportion by weight indicated:

| | |
|---|---|
| Sucrose, U.S.P. | 80.3 |
| Tapioca starch | 13.2 |
| Magnesium stearate | 6.5 |

Into this tablet base there is blended sufficient α-acetoxyacetamidobenzylpenicillin 3-pivaloyloxymethyl ester to provide tablets containing 20, 100 and 250 mg. of active ingredient per tablet. The compositions are each compressed into tablets, each weighing 360 mg., by conventional means.

EXAMPLE 16

Capsules

A blend is prepared containing the following ingredients:

| | |
|---|---|
| Calcium carbonate, U.S.P. | 17.6 |
| Dicalcium phosphate | 18.8 |
| Magnesium trisilicate, U.S.P. | 5.2 |
| Lactose, U.S.P. | 5.2 |
| Potato starch | 5.2 |
| Magnesium stearate A | 0.8 |
| Magnesium stearate B | 0.35 |

To this blend is added sufficient α-mandelamidobenzylpenicillin 3-pivaloyloxymethyl ester to provide capsules containing 20, 100 and 250 mg. of active ingredient per capsule. The compositions are filled into conventional hard gelatin capsules in the amount of 350 mg. per capsule.

EXAMPLE 17

Injectable preparation

One thousand grams of α-acetoxyacetamidobenzylpenicillin sodium salt are intimately mixed and ground with 2500 grams of sodium ascorbate. The ground dry mixture is placed in vials and sterilized with ethylene oxide after which the vials are sterilely stoppered. For intravenous administration, sufficient water is added to the materials in the vials to form a solution containing 10 mg. of active ingredient per milliliter of injectable solution.

EXAMPLE 18

Suspension

A suspension of α-mandelamidobenzylpenicillin is prepared with the following composition:

| | | |
|---|---|---|
| Effective ingredient | g | 25.00 |
| 70% Aqueous sorbitol | g | 741.29 |
| Glycerine, U.S.P. | g | 185.35 |
| Gum acacia (10% solution) | ml | 100.00 |
| Polyvinylpyrrolidone | g | 0.50 |
| Distilled water, sufficient to make 1 liter. | | |

To this suspension, various sweeteners and flavorants are added to improve the palatability of the suspension. The suspension contains approximately 25 mg. of effective agent per milliliter.

EXAMPLE 19

Solution

A solution of α-benzoyloxyacetamidobenzylpenicillin sodium salt is prepared with the following composition:

| | | |
|---|---|---|
| Effective ingredient | grams | 30.22 |
| Magnesium chloride hexahydrate | do | 12.36 |
| Monoethanolamine | ml | 8.85 |
| Propylene glycol | grams | 376.00 |
| Water, distilled | ml | 94.00 |

The resultant solution has a concentration of effective ingredient of 50 mg./ml. and is suitable for parenteral and especially for intramuscular administration.

What is claimed is:

1. A compound selected from the group of penicillins having the formula:

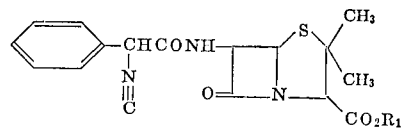

wherein $R_1$ is selected from the group consisting of 1-alkanoyloxymethyl wherein said alkanoyloxy contains from 2 to 5 carbon atoms; phenacyl; benzyl and substituted benzyl wherein said substituent is selected from the group consisting of 4-bromo, 4-nitro and 3,5-di-t-butyl-4-hydroxy; bis(4-methoxyphenyl)methyl; trimethylsilyl; and benzylideneimino.

2. A compound of claim 1 wherein $R_1$ is 1-alkanoyloxymethyl wherein said alkanoyloxy contains from 2 to 5 carbon atoms.

3. The compound of claim 2 wherein $R_1$ is $$(CH_3)_3CCO_2CH_2-.$$

4. The compound of claim 1 wherein $R_1$ is phenacyl.

5. The compound of claim 1 wherein $R_1$ is trimethylsilyl.

6. A compound of claim 1 wherein $R_1$ is benzyl or substituted benzyl wherein said substituent is selected from the group consisting of 4-bromo, 4-nitro and 3,5-di-t-butyl-4-hydroxy.

7. The compound of claim 6 wherein $R_1$ is 4-bromobenzyl.

8. The compound of claim 6 wherein $R_1$ is benzyl.

9. The compound of claim 1 wherein $R_1$ is benzylideneimino.

References Cited

UNITED STATES PATENTS

| | | | |
|---|---|---|---|
| 3,352,851 | 11/1967 | Fosker | 260—239.1 |
| 3,454,557 | 7/1969 | Patchett et al. | 260—239.1 |
| 3,555,011 | 1/1971 | Ekström et al. | 260—239.1 |

NICHOLAS S. RIZZO, Primary Examiner

U.S. Cl. X.R.

424—271